US010951706B2

(12) United States Patent
Hsieh et al.

(10) Patent No.: US 10,951,706 B2
(45) Date of Patent: Mar. 16, 2021

(54) HIGH-THROUGHPUT ALGORITHM FOR MULTIVERSION CONCURRENCY CONTROL WITH GLOBALLY SYNCHRONIZED TIME

(71) Applicant: Google Inc., Mountain View, CA (US)

(72) Inventors: Wilson Cheng-Yi Hsieh, Syosset, NY (US); Peter Hochschild, New York, NY (US)

(73) Assignee: Google LLC, Mountain View, CA (US)

( * ) Notice: Subject to any disclaimer, the term of this patent is extended or adjusted under 35 U.S.C. 154(b) by 634 days.

(21) Appl. No.: 15/374,722

(22) Filed: Dec. 9, 2016

(65) Prior Publication Data
US 2018/0167460 A1 Jun. 14, 2018

(51) Int. Cl.
| H04L 29/08 | (2006.01) |
| H04L 29/06 | (2006.01) |
| G06F 16/23 | (2019.01) |
| G06F 16/176 | (2019.01) |

(52) U.S. Cl.
CPC ...... *H04L 67/1097* (2013.01); *G06F 16/1767* (2019.01); *G06F 16/2329* (2019.01); *H04L 67/1095* (2013.01); *H04L 67/42* (2013.01)

(58) Field of Classification Search
CPC .. H04L 67/1097; H04L 67/42; H04L 67/1095
USPC .................................................. 709/203–204
See application file for complete search history.

(56) References Cited

U.S. PATENT DOCUMENTS

| 5,212,788 A | 5/1993 | Lomet et al. |
| 5,715,447 A | 2/1998 | Hayashi et al. |
| 6,341,285 B1 | 1/2002 | Blott et al. |
| 6,434,710 B1 | 8/2002 | Sato et al. |
| 6,721,765 B2 | 4/2004 | Ghosh et al. |

(Continued)

FOREIGN PATENT DOCUMENTS

| CN | 104317944 A | 1/2015 |
| EP | 0278312 A2 | 8/1988 |

(Continued)

OTHER PUBLICATIONS

Uffe Kock Will and John J. Leggett, Concurrency Control in Collaborative Hypertext Systems, Proceedings of the Fifth ACM Conference on Hypertext, Hypertext '93 Seattle, Washington, USA, Nov. 14-18, 1993, 13 pages.

(Continued)

*Primary Examiner* — Minh Chau Nguyen
(74) *Attorney, Agent, or Firm* — Lerner, David, Littenberg, Krumholz & Mentlik, LLP

(57) ABSTRACT

Throughput is preserved in a distributed system while maintaining concurrency by pushing a commit wait period to client commit paths and to future readers. As opposed to servers performing commit waits, the servers assign timestamps, which are used to ensure that causality is preserved. When a server executes a transaction that writes data to a distributed database, the server acquires a user-level lock, and assigns the transaction a timestamp equal to a current time plus an interval corresponding to bounds of uncertainty of clocks in the distributed system. After assigning the timestamp, the server releases the user-level lock. Any client devices, before performing a read of the written data, must wait until the assigned timestamp is in the past.

20 Claims, 9 Drawing Sheets

(56) References Cited

U.S. PATENT DOCUMENTS

| | | | |
|---|---|---|---|
| 7,822,728 B1* | 10/2010 | Chandler | G06F 16/1774 707/704 |
| 9,213,717 B1* | 12/2015 | Pawar | G06F 17/30171 |
| 9,230,000 B1 | 1/2016 | Hsieh et al. | |
| 9,632,828 B1* | 4/2017 | Mehta | G06F 16/2343 |
| 9,760,597 B2* | 9/2017 | Jimenez Peris | G06F 17/30353 |
| 2002/0087500 A1* | 7/2002 | Berkowitz | G06F 17/30348 |
| 2003/0028695 A1 | 2/2003 | Burns et al. | |
| 2003/0236786 A1 | 12/2003 | Shi et al. | |
| 2006/0064554 A1* | 3/2006 | Fridella | G06F 3/0614 711/152 |
| 2014/0040208 A1 | 2/2014 | Graefe et al. | |
| 2015/0317349 A1* | 11/2015 | Chao | G06F 16/2336 707/615 |
| 2017/0344596 A1* | 11/2017 | Fuller | G06F 9/466 |

FOREIGN PATENT DOCUMENTS

| | | | |
|---|---|---|---|
| WO | 2013184712 A2 | 12/2013 | |
| WO | WO-2013184712 A2 * | 12/2013 | G06F 17/30292 |

OTHER PUBLICATIONS

Atul Adya, Robert Gruber, Barbara Liskov and Umesh Maheshwari, Efficient Optimistic Concurrency Control Using Loosely Synchronized Clocks, May 1995, 12 pages.

James Cowling and Barbara Liskov, Granola: Low-Overhead Distributed Transaction Coordination, 2012, 13 pages.

Per-Åke Larson, Spyros Blanas, Cristian Diaconu, Craig Freedman, Jignesh M. Patel, and Mike Zwilling, High-Performance Concurrency Control Mechanisms for Main-Memory Databases, Dec. 2011, 12 pages.

"OSDI '06 Paper", [online]. [Retrieved Nov. 14, 2016] Retrieved from the internet: <http://static.usenix.org/events/osdi06/tech/full_papers/burrows_html>, 22 pages.

James C. Corbett, et al., Spanner: Google's Globally Distributed Database, Aug. 2013, 22 pages, ACM Transactions on Computer Systems, vol. 31, No. 3, Article 8.

Theodore Faber, Joe Touch and Wei Yue, The TIME-WAIT state in TCP and Its Effect on Busy Servers, 1999, IEEE, 11 pages.

Patrick Hunt, Mahadev Konar, Flavio P. Junqueira and Benjamin Reed, ZooKeeper: Wait-free Coordination for Internet-scale Systems, 2010, 14 pages.

Bernstein P. A., Concurrency Control in Distributed Database Systems. ACM Computing Surveys, Jun. 1, 1981, vol. 13, No. 2, pp. 185-221. Retrieved from the Internet: <https://people.eecs.berkeley.edu/~kubitron/cs262/handouts/papers/concurrency-distributed-databases.pdf>.

Notice of Eligibility for Grant, Search Report, and Examination Report for Singapore Patent Application No. 10201707669X dated May 2, 2018. 10 pages.

Search Report dated Feb. 26, 2018, for United Kingdom Patent Application No. 1715226.5. 4 pages.

Search Report and Written Opinion dated Mar. 14, 2018, for Irish Patent Application No. 2017/0198. 5 pages.

Corbett et al. "Spanner: Google's Globally Distributed Database", Published 2012, PDF Available from <https://www.usenix.org/conference/osdi12/technical-sessions/presentation/corbett>. 14 pages.

Yang Jade: "From Google File System to Omega: A Decade of Advancement in Big Data Management at Google", 2015 IEEE First International Conference on Big Data Computing Service and Applications, IEEE, Mar. 30, 2015 (Mar. 30, 2015), pp. 249-255, XP033192953, DOI: 10.1109/BIGDATASERVICE.2015.47.

International Search Report and Written Opinion for International Application No. PCT/US2017/053450 dated Jan. 8, 2018. 17 pages.

Office Action for German Patent Application No. 10 2017 121 358.9 dated Mar. 20, 2019.

International Preliminary Report on Patentability for International Application No. PCT/US2017/053450 dated Jun. 20, 2019. 10 pages.

Office Action for European Patent Application No. 17784105.3 dated Oct. 6, 2020. 11 pages.

* cited by examiner

HIGH-THROUGHPUT ALGORITHM FOR MULTIVERSION CONCURRENCY CONTROL WITH GLOBALLY SYNCHRONIZED TIME

BACKGROUND

In database systems, the term concurrency control refers to the algorithm used to ensure that the database behaves consistently, even in the presence of concurrency. Multiversion concurrency-control algorithms store multiple versions of a given piece of data (one per write), so as to enable greater concurrency. Systems that provide a global notion of absolute time can be integrated with multiversion concurrency control in a distributed database. The resulting distributed database is semantically equivalent to a single-machine database, in that consistent reads can be done across the entire database. The consistent reads are ensured using local synchronization between reads and writes at each object in the database, along with a commit wait, where a write needs to be delayed in time to ensure proper semantics. This local synchronization requires expensive global synchronization within the database.

The problem with existing solutions is that the existing algorithms perform commit wait while holding user-level locks at servers. That is, while writing an object in the database, the server performs commit wait while holding the lock that the database uses to protect access to the object being written. This means that throughput of writes to any object is limited to at most (1/commit wait time).

BRIEF SUMMARY

One aspect of the disclosure provides system, comprising a server, the server adapted to communicate with other servers and clients in a distributed computing environment. The server comprises a processor, wherein the processor is configured to receive a request to write data, write the data to a memory in the distributed computing environment, and while the written data is being committed to the memory, release a lock on the server and impose a commit wait time on at least one of a client library, the other servers, or the clients. The commit wait time is a mechanism for ensuring that a client cannot see the effects of a transaction before a timestamp of the transaction. For example, the client waits for an interval of time, referred to as the commit wait time, to pass before seeing the effects of the transaction. In this regard, various clients will get a consistent read of the distributed computing environment and can make further modifications accordingly.

In examples where the commit wait is imposed on both the client library and the other servers, the commit wait is performed by the client library before the client library notifies one of the clients that the written data was committed. The other servers perform the commit wait when executing a transactional read.

In other examples where the commit wait is imposed only on the clients, the processor sends to the client the timestamp at which the data was written. That timestamp may have been assigned as the local time at the server that wrote the data, plus an amount of time that bounds a difference between all clocks in the system. That time should be in the future, after the time of any write that has already committed. Any of the clients, before returning the data to a client, wait until the assigned timestamp is in the past. For example, the assigned timestamp would be in the past when a local clock at the client reading the data reflects a current time that is later than the assigned timestamp. The amount of time that bounds a difference between all clocks in the system may be maintained by the local clock at the server as an interval $\varepsilon$. The processor may be further configured to receive a second request to write second data, and write the data to the memory in the distributed computing environment, without waiting for the commit wait time to expire.

Another aspect of the disclosure provides a method, comprising receiving, at a first computing device, a request from one or more clients to write data to a distributed computing environment, obtaining, at the first computing device, a write lock, writing, by the first computing device, the data to a memory in the distributed computing environment, and releasing, by the first computing device, the write lock without waiting for a commit wait time to expire, such that the commit wait time is imposed on at least one of a client library, other servers, or the clients.

To move the commit wait to the clients, the processor is further configured to assign a timestamp to the written data, the timestamp equal to a first time plus an interval, and release the lock after assigning the timestamp. Any of the clients, before reading the data, wait until the assigned timestamp is in the past.

DETAILED DESCRIPTION

Overview

Figure 1:
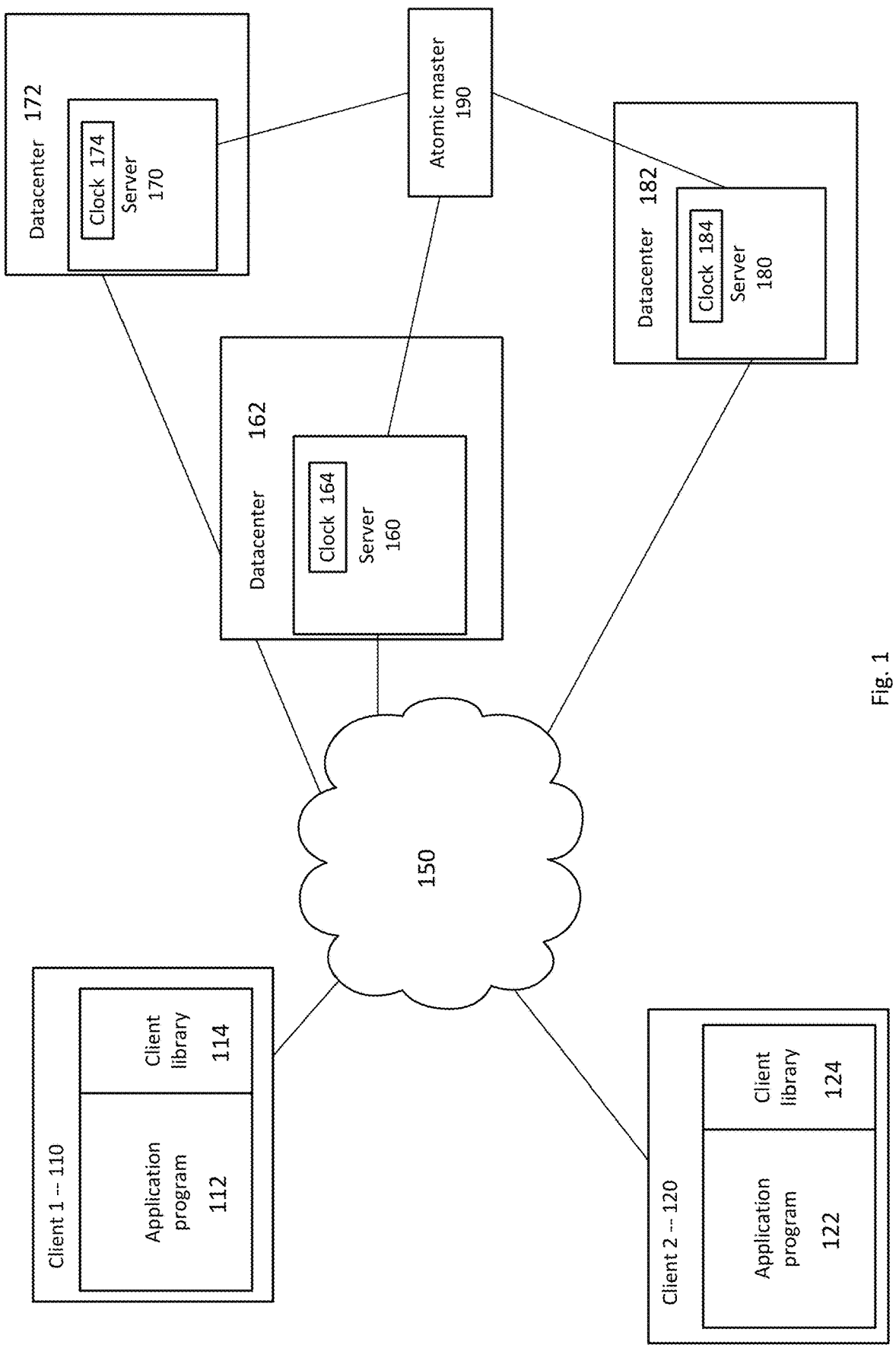
FIG. 1 is a block diagram illustrating an example system according to aspects of the disclosure.

The present disclosure relates to a method for reducing a period of time in which a device in a distributed system must wait for a write transaction to be committed while still preserving consistency throughout the distributed system. This period of time, referred to as a commit wait time, is moved outside of a second time period in which a user-level lock is held. Server-side code is relieved of the waiting period of the commit wait time, and instead the commit wait time is imposed on a client library. For example, a timestamp associated with the write transaction is noted, the user-level lock is released, and any device in the distributed database that wants to read the committed write transaction must wait until that timestamp is guaranteed to be in the past.

In a first example, the commit wait does not occur at a device that executed the write transaction, but instead the commit wait occurs in two places. It occurs in the client library before the client library notifies a client that it has committed a write. It also occurs at the server, in that any device attempting to read the written data discovers a time for which it must commit wait at the server. Accordingly, the commit wait is moved from the "writers" to the "readers." This does not change an observable commit order of transactions. Moreover, it does not change a commit order of data-dependent transactions.

In a second example, the commit wait is pushed to client commit paths and to future readers. For example, as opposed to servers performing commit waits, the servers assign timestamps, which are used to ensure that causality is preserved. For example, when a server executes a transaction that writes data to a distributed database, the server may acquire a user-level lock, and assign the transaction a timestamp equal to (current time+$\varepsilon$), where $\varepsilon$ would be a measure of the uncertainty of clocks in the distributed system. For example, $\varepsilon$ may represent a difference between a latest time reported by all clocks in the system and an earliest time reported by all clocks in the system. $\varepsilon$ may typically be, for example, less than 3 ms in some implementations of a global clock. After assigning the timestamp, the server releases the user-level lock. The database must guarantee that no client devices read that data prior to the time of the assigned timestamp. For example, client library code would enforce this invariant. In other words, the clients must wait a period of time dependent on $\varepsilon$ before executing a read of the data written by the server.

In the second example above, commit wait is done in parallel across all clients. Because the server must communicate with the clients, overlapping the commit wait time with a time for communications between the server and the clients reduces an overall wait time. If it takes a long time for a message from the server to reach the client, the client will have to commit wait for a lesser period of time. Each client may have a different local time. Accordingly, clients having a later local time may experience a short commit wait time, because the assigned timestamp will be reached more quickly. Conversely, clients having an earlier local time may experience a longer commit wait time. By releasing servers of the user-level lock during commit wait times, throughput at the servers is increased. At the same time, concurrency is maintained in the distributed database, and reads will be accurate and consistent across all clients, reflecting the committed data regardless of discrepancies in local clock times.

Examples Systems

FIG. 1 illustrates an example system including a distributed database. A plurality of servers 160, 170, 180 may communicate with each other, for example, over a network 150. The servers 160, 170, 180 may further communicate with a plurality of client devices, such as clients 110, 120. The servers 160-180 may control storage of data in one or more databases. For example, as shown each server 160-180 is associated with a datacenter 162, 172, 182. Each datacenter 162, 172, 182 may include a plurality of computing devices for storing data. While some devices may be replicas of other devices, some devices may be causally dependent on others. For example, bits of data written in datacenter 162 may affect data stored in datacenter 172. The distributed database may implement a protocol, such as Paxos, to provide consensus across the system. In some current systems, consistency across the datacenters 162, 172, 182 is maintained by the servers 160, 170, 180, which wait for a period of time (e.g., the commit wait) to pass before publishing a write transaction. However, this waiting period by the servers during writes reduces throughput. Accordingly, the waiting period may instead be imposed on one or more other devices, or moved in time to different actions of the server. For example, the waiting period may be moved to the client library of the client writing data to the server, and other servers may need to perform a commit wait at the server before executing a read transaction. In other examples, the commit wait is moved to the client library that runs on the client devices seeking to read the written data.

While only a few servers are shown, it should be understood that any number of servers may be included in the distributed database. Similarly, while each server 160, 170, 180 is shown as being associated with its own datacenter, it should be understood that in other examples the servers may be associated with one or more smaller databases. For example, one database may include multiple servers. Examples of distributed systems are further described in U.S. patent application Ser. No. 13/905,637, which is hereby incorporated by reference herein in its entirety.

Each of clients 110, 120 is shown as having an application program 112, 122 and a client library 114, 124, though it should be understood that additional features of client devices may also be present. Either of the clients 110, 120 may write data to the distributed database by sending data over the network 150 to one of the servers 160, 170, 180. While only a few clients are shown, it should be understood that a vast number of client devices may communicate with the distributed database over the network 150.

The datacenters 162, 172, 182 may be positioned a considerable distance from one another. For example, as further described in connection with FIG. 2, the datacenters may be positioned in various countries around the world. Each datacenter 162, 172, 182 may include a number of storage devices, such as hard drives, random access memory, disks, disk arrays, tape drives, or any other types of storage devices. The datacenters 162, 172, 182 may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like. The datacenters may include a number of other devices in addition to the storage devices, such as cabling, routers, etc. Further, in some examples the datacenters 162, 172, 182 may be virtualized environments.

Each server has a local clock 164, 174, 184. Each local clock 164, 174, 184 may derive its time from an atomic time master 190. Atomic time master 190 may be, for example, a reference clock in communication with one or more servers in the distributed database. As further described below in connection with FIG. 3, the atomic time master 190 may derive its time from another source, such as a GPS.

Figure 2:
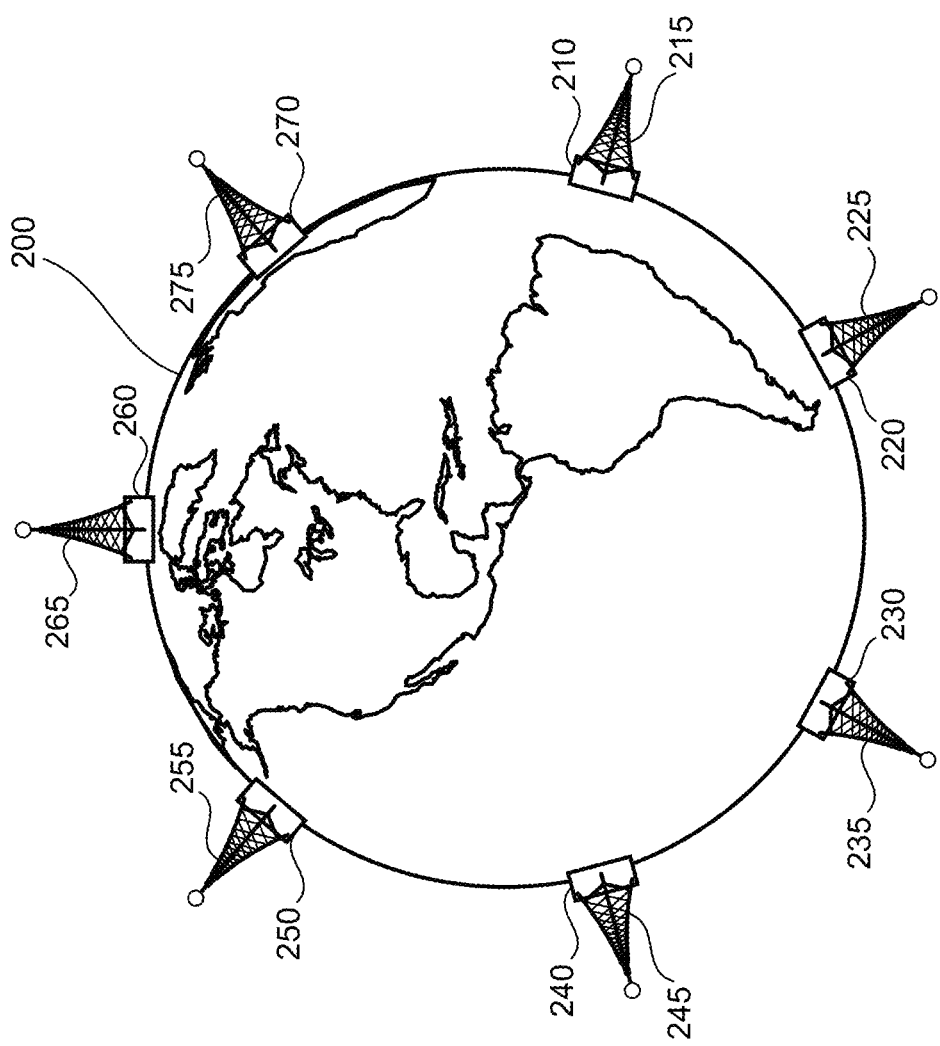
FIG. 2 is a pictorial diagram illustrating distribution of a database according to aspects of the disclosure.

FIG. 2 is a geographical illustration of data centers 210, 220, 230, 240, 250, 260 and 270 positioned at various locations on earth. According to some examples, each datacenter may include an atomic time master. Each atomic time master may be connected to a receiver such as a GPS receiver for receiving time signals. The GPS receivers may include, for example, roof-mounted antennas 215, 225, 235, 245, 255, 265 and 275, which may be located on the roof above data centers 210, 220, 230, 240, 250, 260 and 270. Host servers may be housed in server racks located in the data centers 210, 220, 230, 240, 250, 260 and 270. As such, conduits may be installed to route antenna cables from a host server to the roof top antennas. It may be possible to share one antenna across several receivers. This can be achieved, for example, with an antenna splitter.

Figure 3:
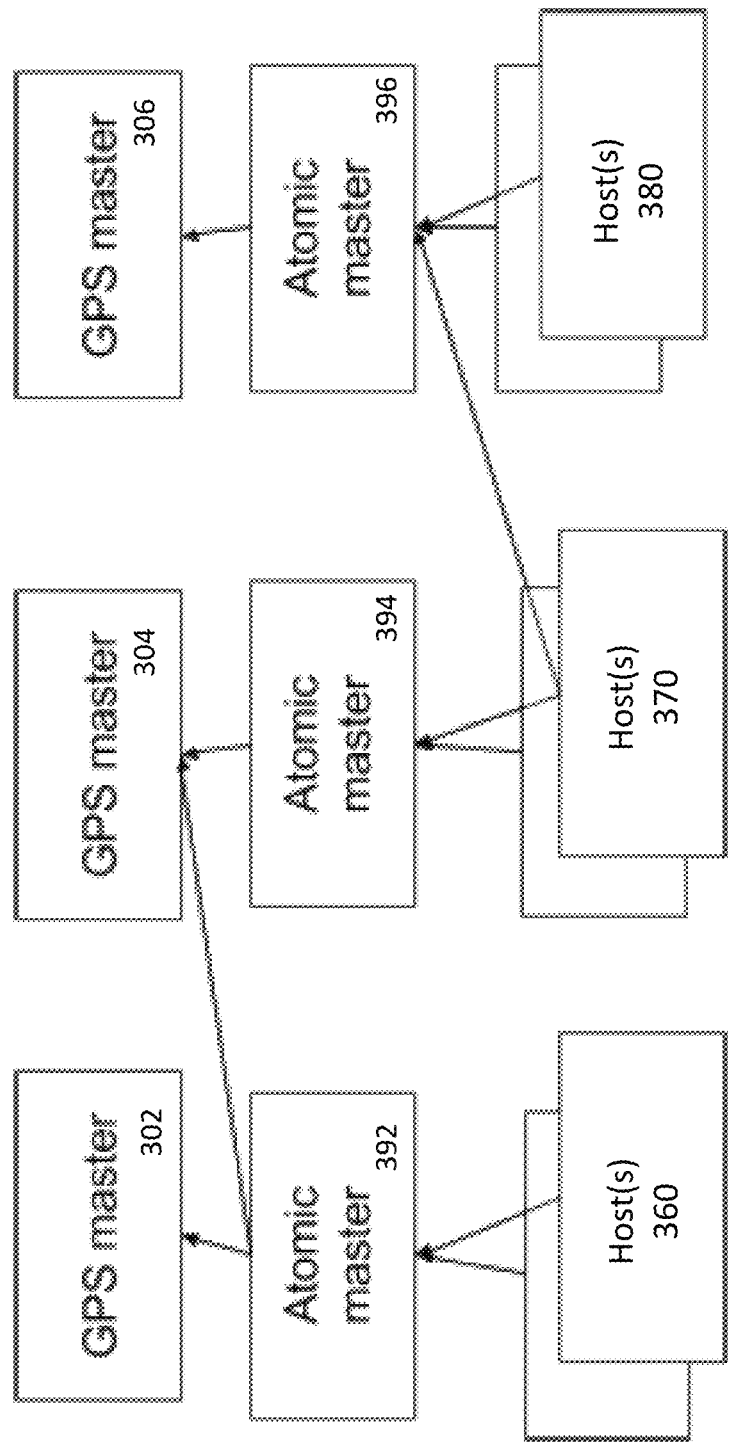
FIG. 3 is a block diagram illustrating hierarchical relationships among servers in a distributed database according to aspects of the disclosure.

FIG. 3 illustrates an example of a time platform 300 that provides a tightly synchronized global clock across datacenters. In this example, the platform 300 is structured as a three-level hierarchy of servers, each server including its own clock, where child servers calibrate their clocks based on their parents' clocks. Application programs run on hosts 360, 370, 380.

Arrows point from servers that calibrate their clocks to well-known servers with better clocks from which they calibrate. For example, as shown, hosts 360 calibrate their clocks based on atomic master 392. Atomic master 392 calibrates its clock based on GPS time masters 302, 304. Hosts 370 calibrate their clocks based on atomic master 394 and 396. Atomic master 394 calibrates its clock based on GPS master 304. Hosts 380 calibrate their clocks based on atomic master 396, which calibrates its clock based on GPS master 306. In some examples, child servers may determine which parent servers to use for calibration based on, for example, geographical position, signal strength, or any other indicia. In other examples, the child/parent pairings may be predetermined. While FIG. 3 shows the hosts 360, 370, 380 calibrating to the atomic masters 392, 394, 396, it should be understood that in other examples the hosts 360, 370, 380 may additionally or alternatively calibrate directly to the GPS time masters 302, 304, 306.

At each level in the hierarchy, calibration consists of polling a server's parent(s), and intersecting one or more time intervals received from the parent(s), expanded by network latency of the calibration from the hosts involved. Each server may have an associated value ($\epsilon$) representing a greatest difference in time between a time reflected on the server's local clock and times reflected by other servers' clocks in the database. Each server's value of $\epsilon$ is derived from its parent's $\epsilon$, with adjustments to uncertainty that come from a product of oscillator frequency uncertainty and effective calibration interval, and server-to-parent network round trip time (RTT). Accordingly, in some examples, a local clock at each server may maintain a different value of $\epsilon$. In other examples, $\epsilon$ may be globally consistent across devices in the system. Further, $\epsilon$ may vary over time in some examples, as parameters such as the oscillator frequency uncertainty, effective calibration interval, and RTT change over time.

Oscillator frequency uncertainty can be modeled as consisting of frequency instability, such as how much an oscillator drifts over short time scales, and oscillator aging, such as how much an oscillator's drift changes over long time scales. The effective calibration interval may be determined by a greater of two values: a calibration interval, such as a period of time between calibrations of the server, and how long the server may have to be disconnected from the parent.

With regard to the server-to-parent network RTT, the farther away a host is from its parents, the more phase uncertainty is introduced. This uncertainty can also be modeled as two components: calibration phase uncertainty and calibration frequency uncertainty. Calibration phase uncertainty may correspond to a level of uncertainty in computing phase alignment of the oscillators. Calibration frequency uncertainty may correspond to a level of frequency uncertainty due to uncertainty in the duration of the calibration period.

Figure 4:
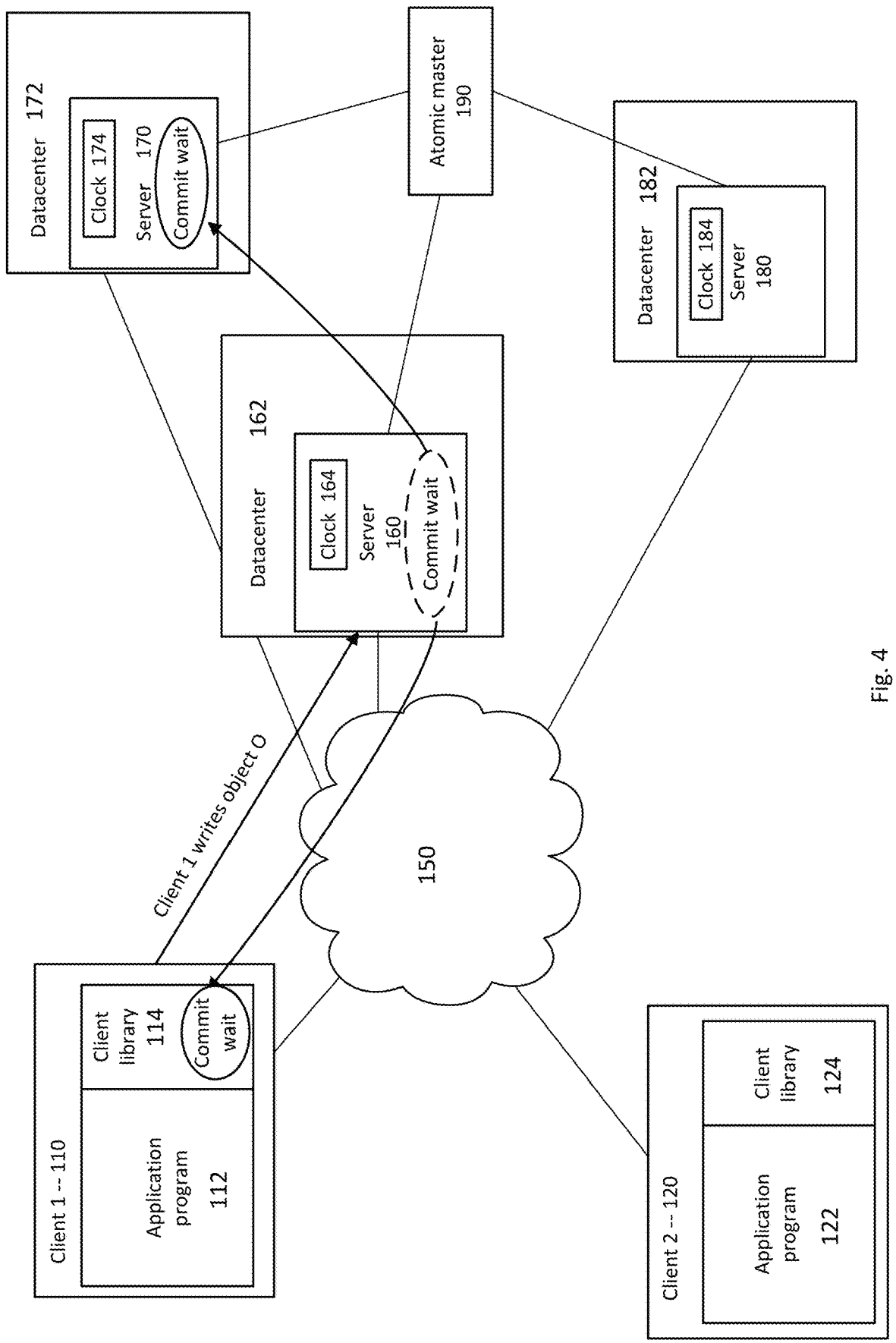
FIG. 4 is a block diagram illustrating an example of moving commit wait times to other devices in the system according to aspects of the disclosure.

FIG. 4 illustrates an example where the commit wait time is pushed to the client library and to any servers seeking to read the written data. In this example, the client 110 executes a transaction, such as writing data to the distributed database. In particular, the client 110 writes object O. A write request is sent from the client 110 over the network 150 to the server 160, which commits the object O to the database. Each of the servers 160, 170, 180, however, may have a different representation of a current time. For example, the clock 164 may be different from the clock 174 which may be different from the clock 184. As discussed above, these differences may be based on, for example, parent servers and factors such as drift, oscillator frequency uncertainty, calibration interval, etc. This range of uncertainty among devices in the distributed database is signified by a value $\epsilon$. Each clock in the database may maintain a time interval $\epsilon$, representing uncertainty bounds. The time interval $\epsilon$ is determined, for example, during calibration as described above in connection with FIG. 3, based on oscillator frequency uncertainty, calibration phase uncertainty, etc. Accordingly, to maintain consistency among the devices, the client library 114 of the client 110 that sent the write request may enforce a wait time based on $\epsilon$ before accessing the written object O. Moreover, any server attempting to read the object O also waits. For example, if the server 170 requested to read data including the object O, the server 170 would need to perform a commit wait, and wait for a period of time to pass. That period of time corresponds to the uncertainty bounds of the local clock.

Figure 5:
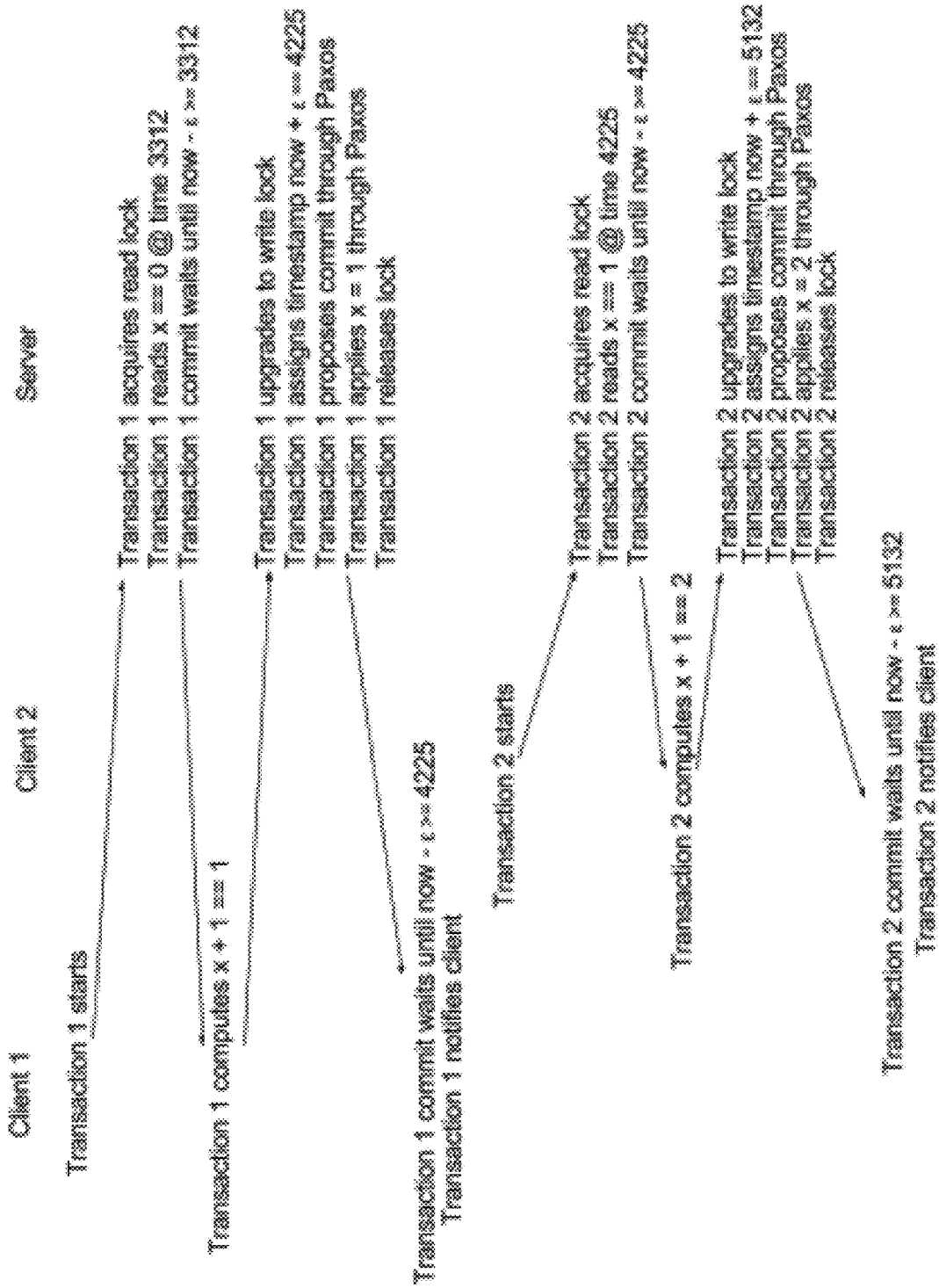
FIG. 5 is a diagram illustrating an example of relative timing of events among devices in the distributed database according to aspects of the disclosure.

FIG. 5 illustrates an example of how and when actions are performed by particular devices in the distributed database to maintain consistency of the database state, by moving commit wait times to the client library and to servers wanting to read the updated data. In this example, a remote single-site read-modify-write (RMW) transaction increments a counter x.

As shown, Client 1 initiates the transaction, and the server acquires a read lock. As the transaction is for incrementing a counter x, and has just started, the server reads x=0. The server reads that the data, x, was written at time 3312. The time of the read, and any other time, may be represented using any of a variety of units, such as seconds of a day, milliseconds, etc. The server commit waits until a time ("now") reflected by its local clock, minus $\epsilon$, is greater than or equal to 3312. Client 1 increments the counter x and requests that x=1 be written to the database. The server upgrades to a write lock for the transaction. In other examples, rather than first acquiring a read lock and upgrading to a write lock, the server could start by obtaining a write lock. The server assigns a timestamp of a current time reflected by its local clock ("now") plus $\epsilon$ (the clock uncertainty). In this example, the resulting timestamp is 4225. The server proposes a commit of the data x=1, applies x=1, and releases the lock. In turn, the client library of Client 1 enforces the commit wait time. Client 1 will be notified that the data x=1 was committed when a current time reflected by Client 1's local clock ("now") minus the uncertainty ($\epsilon$) is greater than or equal to the timestamp assigned by the server (4225).

Client 2 initiates a subsequent transaction, Transaction 2, to increment the counter to x=2. The server again acquires the read lock, reads that x=1 at time 4225, and commit waits for at least a time corresponding to $\epsilon$, e.g., until a time reflected by the server's local clock ("now") minus $\epsilon$ is greater than or equal to the read time (4225). Client 2 then increments the counter to x=2. The server upgrades to a write lock, and assigns a timestamp to Transaction 2 equivalent to the current time of the local clock plus $\epsilon$, which here totals 5132. The server proposes a commit of Transaction 2, applies x=2 to the database, and releases the write lock. Client 2, through its client library, performs the commit wait until its local clock reflects a time greater than or equal to the assigned timestamp of 5132, and afterwards Client 2 is notified that Transaction 2 has committed.

Latency of each Transaction 1 and Transaction 2 in the example above is 2RTT+max(2ε,RTT). The throughput of executing transactions under high contention would be limited by the write lock-hold time, which is the time to log the transaction plus a commit wait=RTT+max(2ε,RTT). The resulting throughput limit would be 1/(RTT+max(2ε,RTT)). RMW transactions that are known to run under high contention may acquire write-mode locks for the appropriate read operations, so as to avoid aborts, since multiple readers that attempt to upgrade their locks deadlock. The resulting throughput would then be approximately 1/(2RTT+max(2ε, RTT)).

In the example of FIG. 5, commit wait occurs in two places: in the client library before it notifies the client that it has committed a write, and at the servers when they are executing transactional reads. Instead of having the writer (server) execute a commit-wait loop (which would logically be equivalent to executing the following code fragment while (now( )+ε<=T) { }, where T is the commit time on the transaction), that loop is instead executed in two kinds of places: by the writer in the client library, before any point in the client library that indicates to the client that the transaction has committed; and by any reads at the server, after it has acquired the lock on the datum being read. In this regard, the commit wait is moved from the writers to causally-related readers. In other examples, a similar result is produced by preceding every read with a commit wait.

Moving commit wait to exit paths at the client results in an observable commit order of transactions which is the same as if the commit wait was performed at the server. Moreover, moving commit wait from writers to readers does not change the commit order of data-dependent transactions. Moving commit wait across servers is also feasible. The commit wait ensures that a timestamp T assigned to a transaction is before event E_release, in which all locks are released. Accordingly, the assigned timestamp T occurs in the interval between when locks are acquired and when the locks are released. Whether the commit wait is moved to the exit paths at the client or across servers, the fact that ε may now be derived from a different oscillator is irrelevant, because after the commit wait has executed, the timestamp T will have passed. Moving the commit wait to the client library for readers ensures that the reader only sees the effects of any transaction after its timestamp is in the past.

Figure 6:
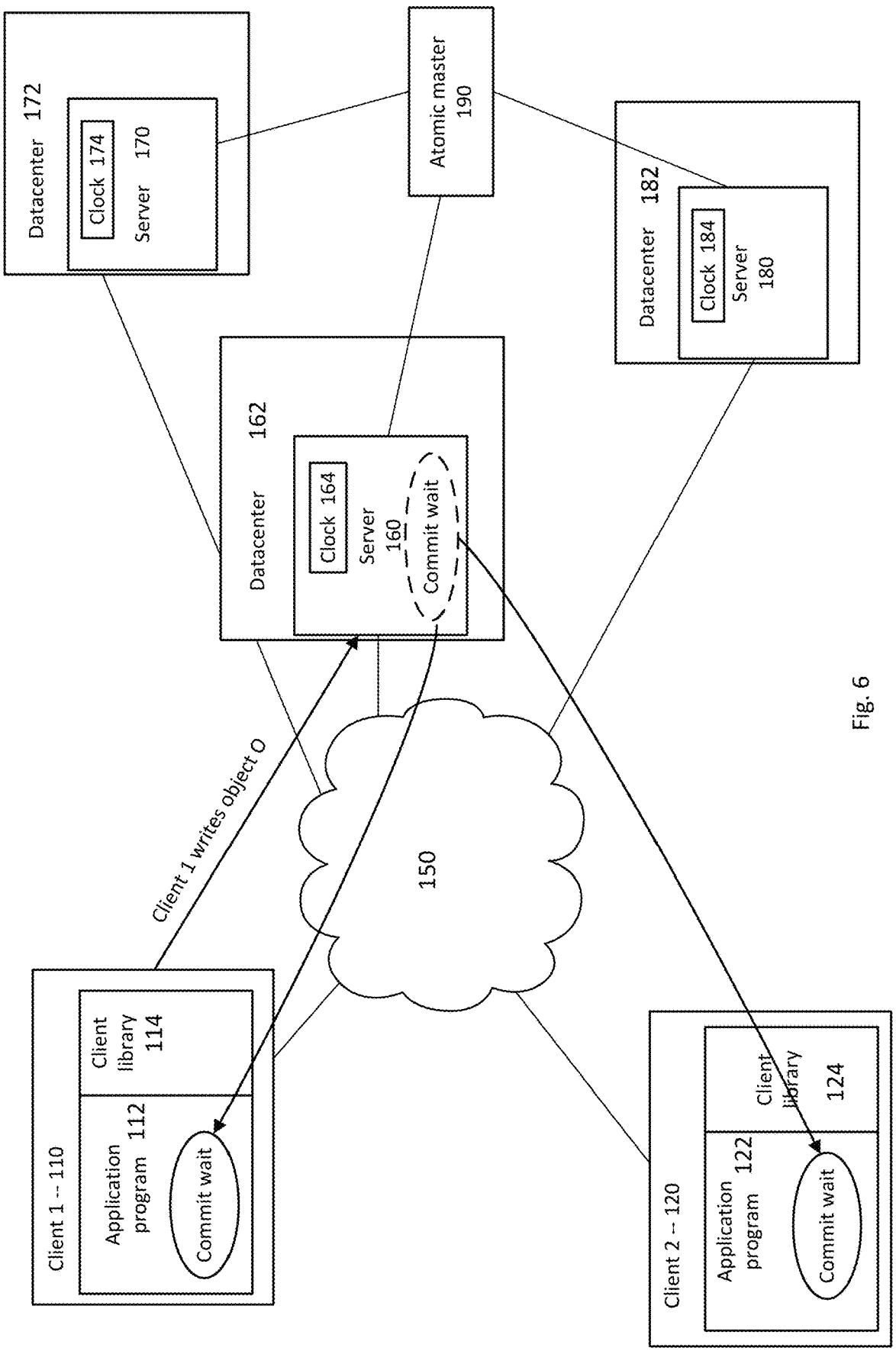
FIG. 6 is a block diagram illustrating another example of moving commit wait times to other devices in the system according to aspects of the disclosure.

FIG. 6 illustrates an example where the commit wait is moved to client commit paths and future readers. In this example, when the client 110 write object O to the distributed database, the server 160 that receives the write request assigns a timestamp to the write transaction. The assigned timestamp is equal to a current time reflected by the server's local clock 164, plus ε. After assigning the timestamp, the server 160 releases a write lock on the transaction. Any client device attempting to execute a read transaction of the database, however, must wait for the assigned timestamp to pass. For example, if the client 120 wanted to execute a read transaction, the client 120 would perform the commit wait. Once a local clock at the client 120 reflected a time greater than or equal to the assigned timestamp, the client would be notified of a successful commit.

Figure 7:
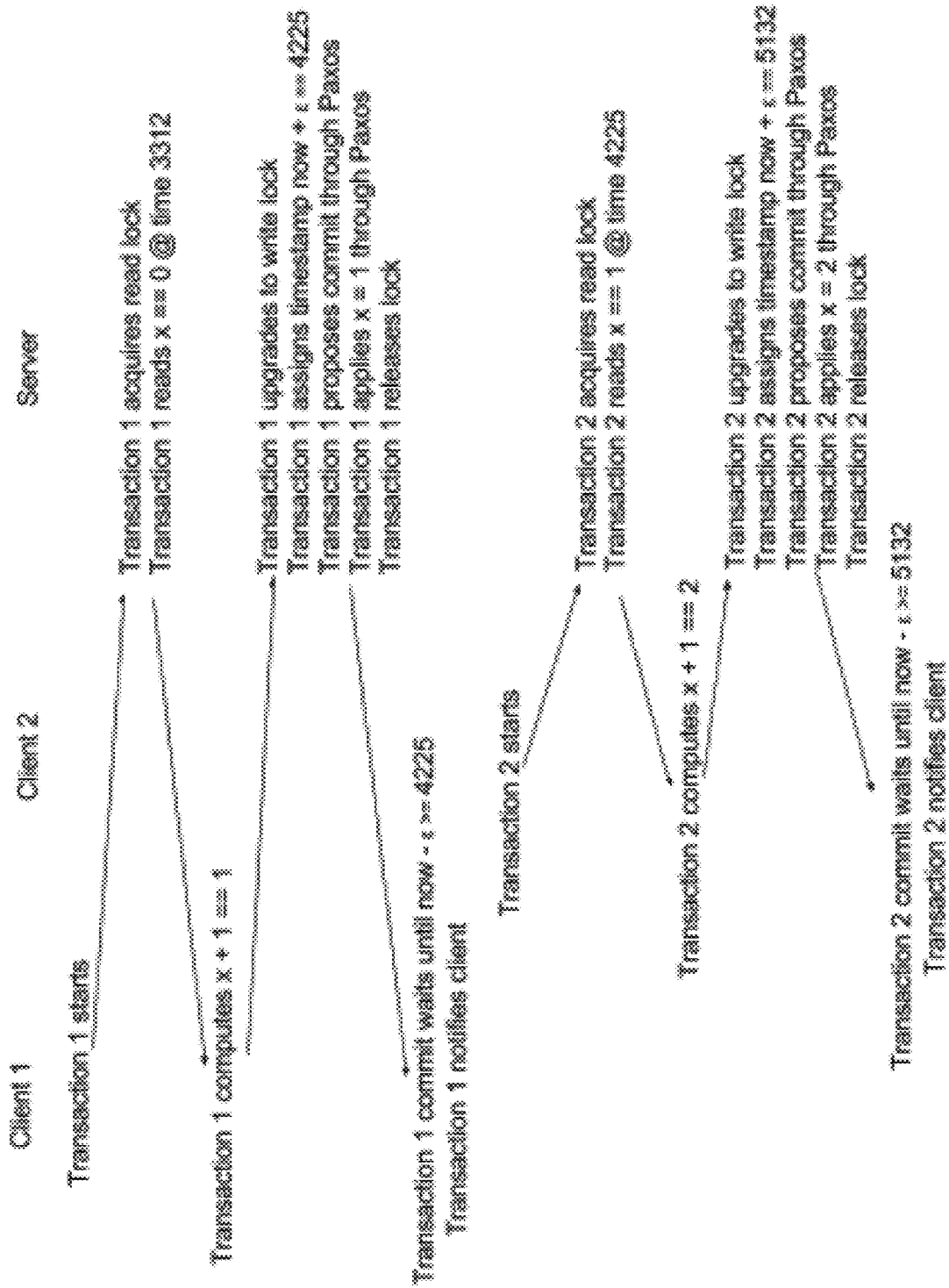
FIG. 7 is a diagram illustrating another example of relative timing of events among devices in the distributed database according to aspects of the disclosure.

FIG. 7 illustrates an example of how and when actions are performed by particular devices when the commit wait time is moved to the client. As compared to the example of FIG. 5, the server does not perform any commit waits for reads of the transaction. Rather, all commit waits happen at the clients. For example, the example of FIG. 7 pushes the commit wait even further through a transaction pipeline as compared to the example of FIG. 5. The commit wait that any writer pushed to a transaction's reads in FIG. 5 is further pushed through the reads at the servers, and then again through the writes to the client commit paths and to future readers in FIG. 7. The commit waits that were pushed from a writer to a reader in the example of FIG. 5 are subsumed in FIG. 7 by the commit waits for the transaction's own write at the client, which must be at a later timestamp than those of the read.

As shown in FIG. 7, Client 1 initiates the transaction, which may again be incrementing a variable x, and the server acquires a read lock for the transaction and reads the data. As the transaction is for incrementing a counter x, and has just started, the server reads x=0. The server reads that x was written, in this example, at time 3312. Client 1 increments the counter x and requests that x=1 be written to the database. The server upgrades to a write lock for the transaction, and assigns a timestamp of a current time reflected by its local clock ("now") plus ε (the commit wait time). For example, the timestamp may be equal to max (now+ε, previous_timestamp++), In this example, the resulting timestamp is 4225. The server proposes a commit of the data x=1, applies x=1, and releases the lock. In turn, the client library of Client 1 enforces the commit wait time. Client 1 will be notified that the data x=1 was committed when a current time reflected by Client 1's local clock ("now") minus the uncertainty time interval (ε) is greater than or equal to the timestamp assigned by the server (4225).

Client 2 initiates a subsequent transaction, Transaction 2, to increment the counter to x=2. The server again acquires the read lock, and reads that x=1 at time 4225. Client 2 then increments the counter to x=2. The server upgrades to a write lock, and assigns a timestamp to Transaction 2 equivalent to the current time of the local clock plus ε, which here totals 5132. The server proposes a commit of Transaction 2, applies x=2 to the database, and releases the write lock. Client 2, through its client library, performs the commit wait until its local clock reflects a time greater than or equal to the assigned timestamp of 5132, and afterwards Client 2 is notified of the Transaction 2.

In some examples, the server may receive Transaction 2 prior to Client 1 being notified that Transaction 1 has been committed. The server may act on Transaction 2, without regard to Client 1's performance of the commit wait.

The servers, rather than performing commit wait, assign timestamps, and ensure that data dependencies are serialized appropriately. Because the servers do not do commit wait, throughput at the servers is unaffected by ε. The clients do commit waits, and thus ensure that causality is preserved. Also, because commit wait is done in parallel across all clients, throughput of each client is only affected by changes in ε, not by the value of ε.

Though the example of FIG. 7 is described with respect to only a few clients and one server, it should be understood that the features described may be applied to multi-site transactions. For example, additional servers positioned at different geographical regions and serving additional clients may similarly assign timestamps, and move commit waits to the clients. In such an example, there should be no commit waits while holding a user-level lock.

In some examples, assignment of the timestamps may also be pushed to the clients. This would result in a latency of RTT+max(2ε, 2RTT). If the client acquires write locks instead of read locks, such as to avoid aborts under high contention, the throughput becomes roughly 1/(3RTT), which is the theoretical maximum throughput of a cell without commit wait.

Figure 8:
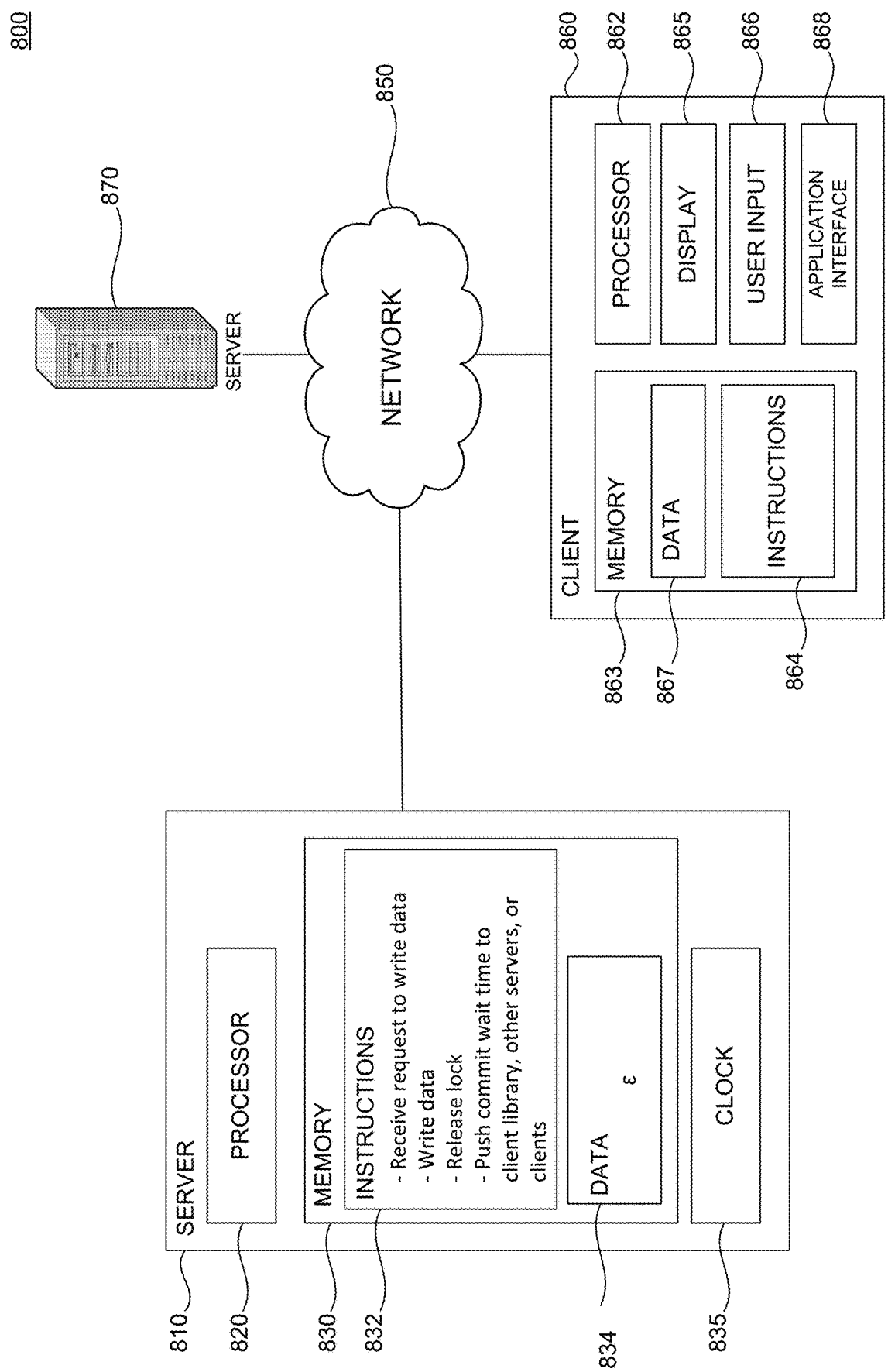
FIG. 8 is another block diagram illustrating an example system according to aspects of the disclosure.

FIG. 8 is a diagram of a system 800 for maintaining consistency in a distributed database while maintaining high throughput. As shown, an example of system 800 may include a number of servers 810 and 870 coupled to a network 850. The system may also include a client 860 capable of communication with the servers 810 and 870 over the network 850.

The server 810 may contain a processor 820, memory 830, and other components typically present in general purpose computers. The memory 830 can store information accessible by the processor 820, including instructions 832 that can be executed by the processor 820. Memory can also include data 834 that can be retrieved, manipulated or stored by the processor 820. The memory 830 may be a type of non-transitory computer readable medium capable of storing information accessible by the processor 820, such as a hard-drive, solid state drive, tape drive, optical storage, memory card, ROM, RAM, DVD, CD-ROM, write-capable, and read-only memories. The processor 820 can be a well-known processor or other lesser-known types of processors. Alternatively, the processor 820 can be a dedicated controller such as an ASIC.

The instructions 832 can be a set of instructions executed directly, such as machine code, or indirectly, such as scripts, by the processor 820. In this regard, the terms "instructions," "steps" and "programs" can be used interchangeably herein. The instructions 832 can be stored in object code format for direct processing by the processor 820, or other types of computer language including scripts or collections of independent source code modules that are interpreted on demand or compiled in advance. Functions, methods, and routines of the instructions are explained in more detail in the foregoing examples and the example methods below.

The data 834 can be retrieved, stored or modified by the processor 820 in accordance with the instructions 832. For instance, although the system and method is not limited by a particular data structure, the data 834 can be stored in computer registers, in a relational database as a table having a plurality of different fields and records, or XML documents. The data 834 can also be formatted in a computer-readable format such as, but not limited to, binary values, ASCII or Unicode. Moreover, the data 834 can include information sufficient to identify relevant information, such as numbers, descriptive text, proprietary codes, pointers, references to data stored in other memories, including other network locations, or information that is used by a function to calculate relevant data. For example, the data 834 can include time data that may be encoded based on the instructions 832 in a time format used to describe instants of time such as Coordinated Universal Time, Unix epoch and unambiguous International Atomic Time epoch.

Although FIG. 8 functionally illustrates the processor 820 and memory 830 as being within the same block, the processor 820 and memory 830 may actually include multiple processors and memories that may or may not be stored within the same physical housing. For example, some of the instructions 832 and data 834 can be stored on a removable CD-ROM and others within a read-only computer chip. Some or all of the instructions and data can be stored in a location physically remote from, yet still accessible by, the processor 820. Similarly, the processor 820 can actually include a collection of processors, which may or may not operate in parallel.

Servers 810 and 870 may be at one node of network 850 and capable of directly and indirectly communicating with other nodes of the network 850. For example, the servers 810 and 870 can include a web server that may be capable of communicating with client device 860 via network 850 such that it uses the network 850 to transmit information to a client application. Servers 810 and 870 may also include a number of computers, e.g., a load balanced server farm, that exchange information with different nodes of the network 850 for the purpose of receiving, processing and transmitting data to client devices. In this instance, the client computers will typically still be at different nodes of the network 850 than the computers making up servers 810 and 870. Although only a few servers 810, 870 are depicted in FIG. 8, it should be appreciated that a typical system can include a large number of connected servers with each being at a different node of the network 850.

Each client 860 may be configured, similarly to servers 810 and 870, with a processor 862, memory 863, instructions 864, and data 867. Each client 860 may be a personal computer, intended for use by a person having all the internal components normally found in a personal computer such as a central processing unit (CPU), CD-ROM, hard drive, and a display device 865, for example, a monitor having a screen, a projector, a touch-screen, a small LCD screen, a television, or another device such as an electrical device that can be operable to display information processed by the processor 862, speakers, a modem and/or network interface device, user input 866, such as a mouse, keyboard, touch screen or microphone, and all of the components used for connecting these elements to one another. Moreover, computers in accordance with the systems and methods described herein may include devices capable of processing instructions and transmitting data to and from humans and other computers including general purpose computers, PDAs, tablets, mobile phones, smartwatches, network computers lacking local storage capability, set top boxes for televisions, and other networked devices.

The client 860 may include an application interface module 868. The application interface module may be used to access a service made available by a server, such as servers 810 and 870. For example, the application interface module may include sub-routines, data structures, object classes and other type of software components used to allow servers and clients to communicate with each other. In one aspect, the application interface module 868 may be a software module operable in conjunction with several types of operating systems known in the arts. For example, the client 860 may be connected to a Structured Query Language (SQL) database server that may operate in conjunction with the application interface module 868 for saving and retrieving information data. Memory 863 coupled to a client 860 may store data 867 accessed by the application module 868. The data 867 can also be stored on a removable medium such as a disk, tape, SD Card or CD-ROM, which can be connected to client 860.

Servers 810 and 870 and client 860 can be capable of direct and indirect communication such as over network 850. For example, using an Internet socket, a client 860 can connect to a service operating on remote servers 810 and 870 through an Internet protocol suite. Servers 810 and 870 can set up listening sockets that may accept an initiating connection for sending and receiving information. The network 850, and intervening nodes, may include various configurations and protocols including the Internet, World Wide Web, intranets, virtual private networks, wide area networks, local networks, private networks using communication protocols proprietary to one or more companies, Ethernet, WiFi (e.g., 802.81, 802.81b, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

Although FIG. 8 shows computing devices 810 and 860 as individual blocks, each of which contains its own processor and memory, the operations described herein may involve a single computing device or many computing devices, e.g., in the "cloud". For example, various operations described herein as involving a single computing device (e.g., a single central processing unit (CPU) in a single server) may involve a plurality of computing devices (e.g., multiple processors in a load-balanced server farm). Similarly, memory components at different locations may store different portions of instructions 832 and collectively form a medium for storing the instructions. In some examples, device 860 may function as a thin client wherein device 810 performs all or nearly all operations that are not directly related to receiving and providing information to users via user input component 866 and display 865. Various operations described herein as being performed by a computing device may be performed by a virtual machine. By way of example, instructions 832 may be specific to a first type of server, but the relevant operations may be performed by a second type of server running a hypervisor that emulates the first type of server. The operations may also be performed by a container, e.g., a computing environment that does not rely on an operating system tied to specific types of hardware.

Example Methods

Figure 9:
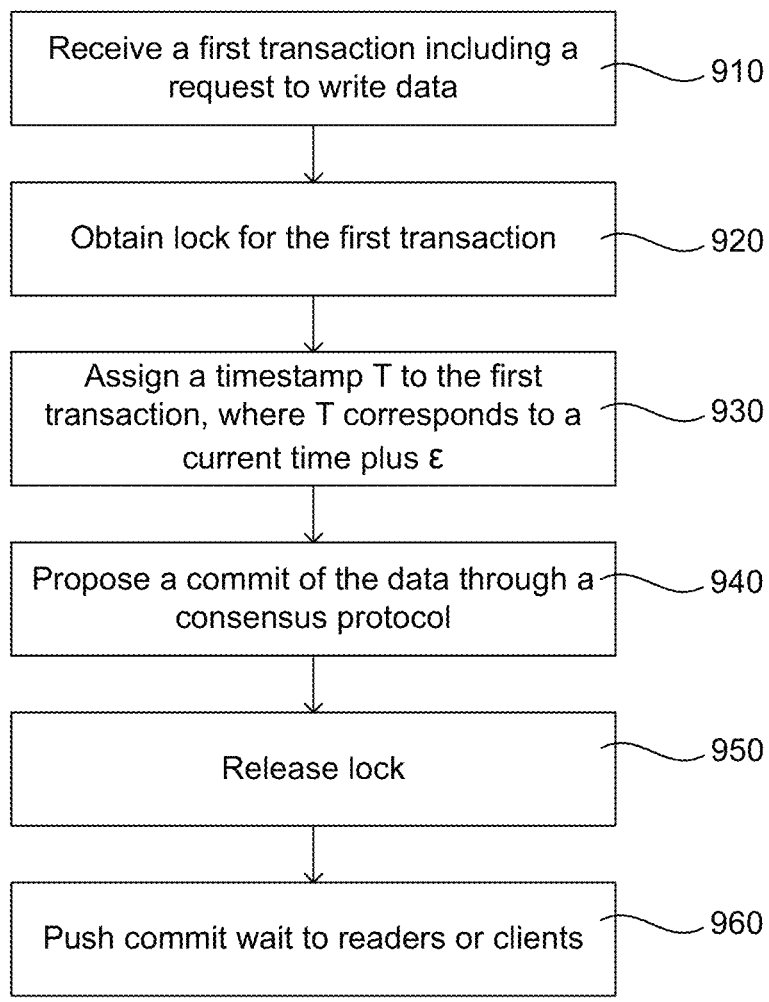
FIG. 9 is a flow diagram illustrating an example method according to aspects of the disclosure.

FIG. 9 illustrates an example method for moving commit waits from a server to other devices, so as not to hold up further processing by the server. It should be understood that the following operations do not have to be performed in the precise order described below. Rather, various steps may be handled in a different order or simultaneously. Steps may also be added or omitted unless otherwise stated.

In block 910, the server receives a first transaction from a client. The first transaction includes a request to write data to a distributed database. For example, the first transaction may be a RMW command, or any other type of command.

In block 920, the servers obtains a lock for the first transaction. The lock may be a write lock. However, in other examples, such as where the first transaction is a RMW command, the server may first obtain a read lock and then upgrade to a write lock.

In block 930, the server assigns a timestamp T to the first transaction. The timestamp T corresponds to a current time, such as a time reflected on a local clock of the server when the timestamp is assigned, plus ε. ε corresponds to bounds of uncertainty of times in the database. For example, ε may be computed as a half a difference between a latest time reflected by a clock in the database and an earliest time reflected by a clock in the database. Due to calibrations of servers based on parent servers, oscillator frequency uncertainty for each device, and/or other factors, each device may have its own value for ε. For example, a value of ε at a first server in the database may be different from a value of ε at a second server in the database. In some examples, each device may store information enabling the device to quickly compute its own value of ε.

In block 940, the server proposes a commit of the data to be written. For example, the server writes the data to the distributed database.

In block 950, the server releases the lock for the first transaction. The server does not perform a commit wait. Rather, the commit wait is pushed to readers or clients in block 960.

The foregoing example methods and systems are advantageous in that they provide for increased throughput of servers, while maintaining consistency in a distributed database. Moreover, such methods and systems can be implemented in a cost effective way, without requiring replacement of all hardware in existing systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system, comprising:
a server device, the server device including at least one input/output to communicate with other servers and clients in a distributed computing environment, the server device comprising:
one or more processors, and
one or more memories storing instructions to be executed by the one or more processors to:
receive a request to write data;
write the data to a memory in the distributed computing environment;
while the written data is being committed to the memory, release a lock on the server; and
while the written data is being committed to the memory, impose a commit wait time for the written data on at least one of a client library, the other servers, or the clients, wherein the commit wait time is an interval of time that must pass before the at least one of the client library, the other servers, or the clients can see the effects of the written data.

2. The system of claim 1, wherein the commit wait is imposed on the clients, and wherein the one or more memories further store instructions to be executed by the one or more processors to:
assign a timestamp to the written data, the timestamp equal to a first time plus an interval;
release the lock after assigning the timestamp.

3. The system of claim 2, wherein the first time is a current time reflected by a local clock at the server when the server assigns the timestamp to the written data.

4. The system of claim 3, wherein the interval corresponds to a difference in time between a latest time reported by all clocks in the distributed system and an earliest time reported by all clocks in the distributed system.

5. The system of claim 4, wherein the interval is maintained by the local clock at the server.

6. The system of claim 2, wherein any of the clients, before reading the data, must wait until the assigned timestamp is in the past.

7. The system of claim 6, wherein the assigned timestamp is in the past when a local clock at the client reading the data reflects a current time that is later than the assigned timestamp.

8. The system of claim 1, wherein the commit wait is imposed on both the client library and the other servers.

9. The system of claim 8, wherein the commit wait is performed by the client library before the client library notifies one of the clients that the written data was committed.

10. The system of claim 8, wherein the other servers perform the commit wait when executing a transactional read.

11. The system of claim 1, wherein the one or more memories further store instructions to be executed by the one or more processors to:
receive a second request to write second data;
write the data to the memory in the distributed computing environment, without waiting for the commit wait time to expire.

12. A method, comprising:
receiving, at a first computing device, a request from one or more clients to write data to a distributed computing environment;
obtaining, at the first computing device, a write lock;
writing, by the first computing device, the data to a memory in the distributed computing environment; and
releasing, by the first computing device, the write lock without waiting for a commit wait time for the write to expire, such that the commit wait time is imposed on at least one of a client library, other servers, or the clients, wherein the commit wait time is an interval of time that must pass before the at least one of the client library, the other servers, or the clients can see the effects of the write.

13. The method of claim 12, wherein the commit wait is imposed on the clients, and wherein the processor is further configured to:
assign a timestamp to the written data, the timestamp equal to a first time plus an interval;
release the lock after assigning the timestamp.

14. The method of claim 13, wherein any of the clients, before reading the data, must wait until the assigned timestamp is in the past.

15. The method of claim 14, wherein the assigned timestamp is in the past when a local clock at the client reading the data reflects a current time that is later than the assigned timestamp.

16. The method of claim 13, wherein the first time is a current time reflected by a local clock at the server when the server assigns the timestamp to the written data, and wherein the interval corresponds to a difference in time between a latest time reported by all clocks in the distributed system and an earliest time reported by all clocks in the distributed system.

17. The method of claim 12, wherein the commit wait is imposed on both the client library and the other servers.

18. The method of claim 17, wherein the commit wait is performed by the client library before the client library notifies one of the clients that the written data was committed.

19. The method of claim 17, wherein the other servers perform the commit wait when executing a transactional read.

20. The method of claim 12, wherein the processor is further configured to:
receive a second request to write second data;
write the data to the memory in the distributed computing environment, without waiting for the commit wait time to expire.

* * * * *